C. A. LAWRENCE.
UMBRELLA-STAND.

No. 171,521.                              Patented Dec. 28, 1875.

Witnesses.
Wos. C. Torrey
H. Chadbourn.

Inventor.
Charles A. Lawrence.
by
Alban Andrin
his atty.

UNITED STATES PATENT OFFICE.

CHARLES A. LAWRENCE, OF BEVERLY, MASSACHUSETTS.

IMPROVEMENT IN UMBRELLA-STANDS.

Specification forming part of Letters Patent No. 171,521, dated December 28, 1875; application filed November 29, 1875.

*To all whom it may concern:*

Be it known that I, CHARLES A. LAWRENCE, of Beverly, in the county of Essex and State of Massachusetts, have invented certain new and useful Improvements in Umbrella-Stands; and I do hereby declare that the following is a full, clear, and exact description thereof, which will enable others skilled in the art to which it pertains to make and use the same, reference being had to the accompanying drawing and to the letters of reference marked thereon, which form a part of this specification.

My invention relates to improvements in umbrella-stands, consisting of a receptacle open in its upper and lower ends, and provided with a detachable bottom, that serves for the purpose of retaining the drippings from the umbrellas that are placed in the stand.

The stand may be made of any desired material, as may also the detachable bottom, although I prefer to make the latter of metal, so as to prevent its breaking when canes or umbrellas are carelessly placed in the stand.

Umbrella-stands have heretofore been made in one solid piece—that is, the stand and bottom have been formed in one single piece—and as they were generally made of clay or porcelain, they were very liable to get broken in dropping umbrellas in them. Umbrella-stands made in one single piece were very inconvenient to empty of the water that accumulates in the bottom, for which purpose such stands had to be turned upside down.

To overcome these objections is the purpose of my invention, as by the employment of a detachable bottom, preferably made of metal, it is insured against breaking, and even if it should get injured it can easily be replaced without the need of a whole new stand.

The water that accumulates in the detachable bottom can be easily removed, simply by lifting the stand away from the detachable bottom, when the latter can be emptied very easily, in the same manner as an ordinary plate or wash-bowl, without the need of reversing the whole stand.

Figure 1:
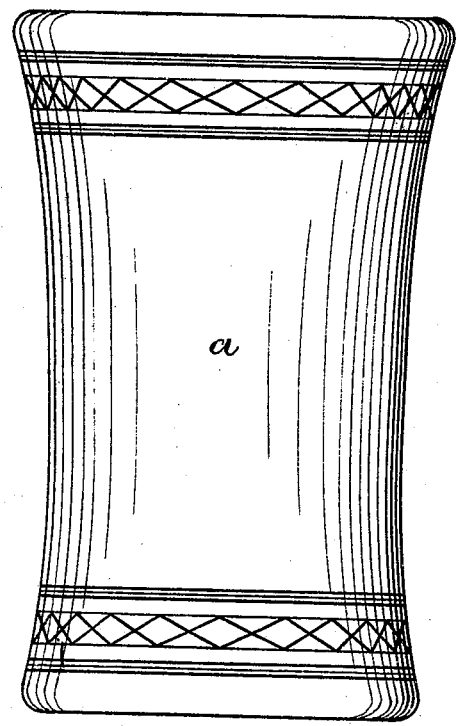
Figure 2:
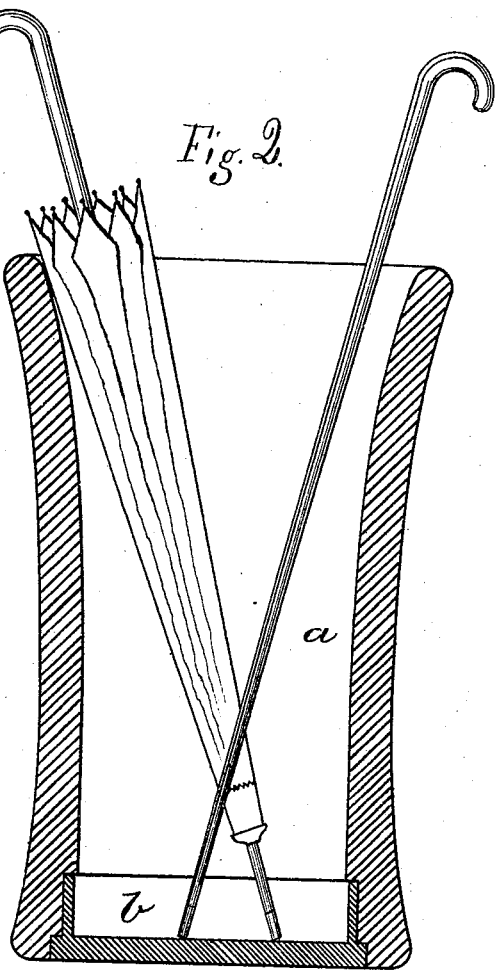
Figure 3:
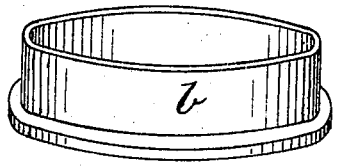

On the accompanying drawings, Figure 1 represents a side elevation, and Fig. 2 represents a central longitudinal section. Fig. 3 represents a perspective view of the detachable bottom.

Similar letters refer to similar parts wherever they occur on the drawings.

$a$ represents the stand or receptacle for umbrellas, canes, &c. Said receptacle is open from top to bottom, as fully shown in Fig. 2. In its lower end is loosely inserted the detachable bottom $b$, that serves for the purpose of retaining the water that drips from the umbrellas placed in the stand.

I do not claim any particular shape of the stand and its bottom, as they may be made circular, square, polygonal, or of any desired form; but What I wish to secure by Letters Patent, and claim, is—

In combination with the umbrella-stand $a$, the detachable bottom $b$, as and for the purpose herein shown and described.

In testimony that I claim the foregoing as my own invention I have affixed my signature in presence of two witnesses.

CHARLES A. LAWRENCE.

Witnesses:
ALBAN ANDRÉN,
HELEN S. ANDRÉN.